(12) United States Patent
Li et al.

(10) Patent No.: US 8,504,880 B2
(45) Date of Patent: Aug. 6, 2013

(54) MECHANISM FOR FACILITATING EFFICIENT ERROR HANDLING IN A NETWORK ENVIRONMENT

(75) Inventors: Wei Li, Foster City, CA (US); Thomas D. Sola, San Francisco, CA (US); Neelav Rana, San Francisco, CA (US); Patrick Louie, San Francisco, CA (US); Arunkumaran Varadharajan, San Francisco, CA (US); Conghui Wu, Union City, CA (US)

(73) Assignee: Salesforce.com, Inc., San Francisco, CA (US)

( * ) Notice: Subject to any disclaimer, the term of this patent is extended or adjusted under 35 U.S.C. 154(b) by 288 days.

(21) Appl. No.: 12/976,880

(22) Filed: Dec. 22, 2010

(65) Prior Publication Data
US 2012/0072783 A1   Mar. 22, 2012

Related U.S. Application Data (60) Provisional application No. 61/384,160, filed on Sep. 17, 2010.

(51) Int. Cl.
*G06F 11/00* (2006.01)
(52) U.S. Cl.
USPC ............................... 714/48; 714/26; 709/223
(58) Field of Classification Search
USPC ............................... 714/26, 48; 709/223, 224
See application file for complete search history.

(56) References Cited

U.S. PATENT DOCUMENTS

| | | | |
|---|---|---|---|
| 5,483,637 A * | 1/1996 | Winokur et al. ............. 714/26 |
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,006,016 A * | 12/1999 | Faigon et al. ............. 714/48 |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |

(Continued)

*Primary Examiner* — Yolanda L Wilson (74) *Attorney, Agent, or Firm* — Blakely, Sokoloff, Taylor & Zafman LLP (57) ABSTRACT

In accordance with embodiments, there are provided methods and systems for facilitating efficient error handling in a network environment. A method of embodiments includes receiving a validation request having configuration parameters of error dialogs relating to errors, and validating the configuration parameters and the errors. The validating includes mapping each error with a corresponding dialog. The method further includes transmitting a validating report having results of validation of the configuration parameters and the errors. The validation report is used to assign an order to each error and its corresponding dialog.

20 Claims, 8 Drawing Sheets

U.S. PATENT DOCUMENTS

| | | |
|---|---|---|
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,389,447 B2 * | 6/2008 | Norman ........................ 714/46 |
| 7,620,655 B2 | 11/2009 | Larsson et al. |
| 8,301,580 B2 * | 10/2012 | Das et al. ...................... 706/61 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0025077 A1 * | 2/2004 | Salem ........................... 714/2 |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0174741 A1 * | 7/2007 | Vasudevan ..................... 714/57 |
| 2008/0183704 A1 * | 7/2008 | Miller et al. ..................... 707/6 |

* cited by examiner

MECHANISM FOR FACILITATING EFFICIENT ERROR HANDLING IN A NETWORK ENVIRONMENT

CLAIM OF PRIORITY

This application claims the benefit of U.S. Provisional Patent Application No. 61/384,160, entitled "Method and Systems for Error Handling in a Network Environment" by Wei Li, et al., filed Sep. 17, 2010, the entire contents of which are incorporated herein by reference and priority is claimed thereof.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to error handling and, more specifically, to a mechanism for facilitating efficient error handling in a network environment.

BACKGROUND

Validation of errors and their management is well known. However, conventional processing and presentation techniques for handling validation errors are convoluted and not known to be efficient or user-friendly. For example, in case of multiple dialogs relating to validation errors, any number of dialogs may be shown simultaneously which can lead to inefficiency in dealing with the errors associated with them. A number of alleged solutions have been proposed to handle this complexity and inefficiency; however, none of the alleged solutions solve the aforementioned shortcomings of the conventional error validation processes. For example, a dialog may be shown with all its errors or all dialogs associated with errors may be shown and neither of these alleged solutions is reliable, efficient or user-friendly.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

Unfortunately, conventional database approaches might become inefficient if, for example, the number of queries received by the database system or the number of interested parties is relatively high.

SUMMARY

In accordance with embodiments, there are provided methods and systems for facilitating efficient error handling in a network environment. A method of embodiments includes receiving a validation request having configuration parameters of error dialogs relating to errors, and validating the configuration parameters and the errors. The validating includes mapping each error with a corresponding dialog. The method further includes transmitting a validating report having results of validation of the configuration parameters and the errors. The validation report is used to assign an order to each error and its corresponding dialog.

While the present invention is described with reference to an embodiment in which techniques for facilitating efficient error handling in a network environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. One or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Methods and systems are provided for facilitating efficient error handling in a network environment.

Embodiments provide for facilitating efficient error handling in a network environment. While designing a user interface (UI) for a configuration page, it is usual to have various dialogs mapped to different sections of a configuration object based on, for example, UE studies. In one embodiment, validation errors are displayed in a reliable, efficient, and user-friendly way. For example, in one embodiment, this eliminates the popping up of multiple out-of-order dialogs on the screen, the typical "round trips" for separate dialog processing, the full validation in which all possible errors messages are shown to the client at once, etc. In one embodiment, each validation error is mapped to a client-side dialog, and an ordering logic is provided to the client computing system to display the validation errors (also referred to as "errors" or "validation error messages") in an order according to, for example, their priorities. Further, user inputs from different dialogs are sent to a server computing system in a batch mode for better performance. During runtime, various dialogs are registered to listen to the validation results from a server computing system. With this setup, if there are any validation errors coming back, all dialogs can collaboratively check the returned errors and elect to show up one at a time according to a pre-defined order.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing efficient error handling in a network environment.

Figure 1:
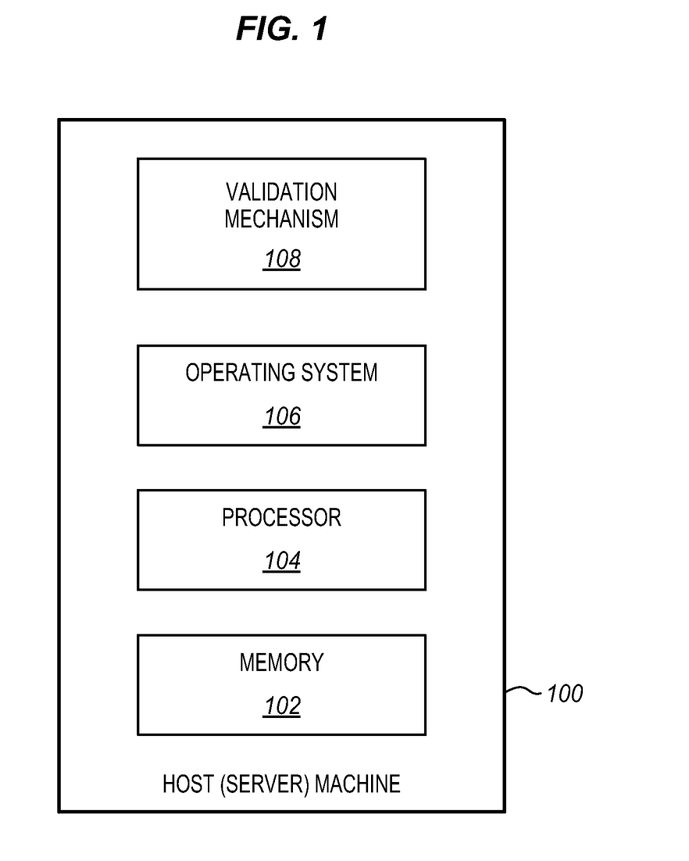
FIG. 1 illustrates a host machine employing validation mechanism according to one embodiment.

FIG. 1 illustrates a host machine 100 employing validation mechanism 108 according to one embodiment. Host machine (e.g., server computing system) 100 comprises a computing platform, which may be capable, for example, of working with a standard operating system 106. Operating system 106 serves as an interface between any hardware or physical resources of the host machine 100 and a user. In some embodiments, base hardware platform may include a processor 104, memory devices 102, network devices, drivers, and so on. Host machine 100 may include a server computing system or a client computing system and further, terms like "machine", "device", "computer", "computing device", and "computing system" are used interchangeably and synonymously throughout this document.

Figure 2A:
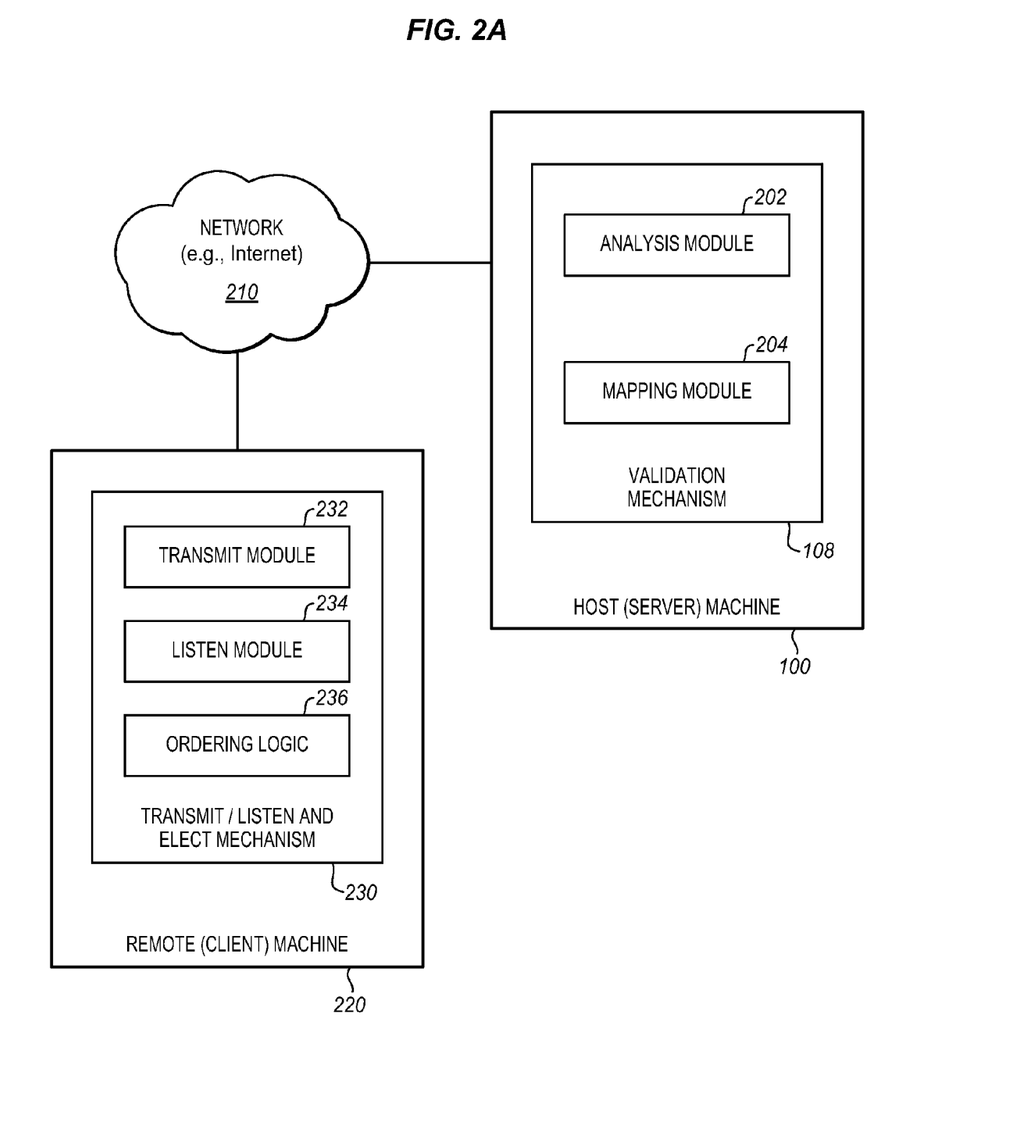
FIG. 2A illustrates validation mechanism according to one embodiment.

In one embodiment, the host machine 100 employs validation mechanism 108 to provide efficient handling and management of validation errors in a network environment, such facilitating validation of errors that is reliable, efficient, and user-friendly. In one embodiment, and as will be illustrated with reference to FIG. 2, various error dialogs are communicated from a remote machine (e.g., client computing system) to the host machine 100 over a network (e.g., Internet). These dialogs are processed at the host machine 100 using the validation mechanism 108. For example, in one embodiment, the processing of dialogs involves mapping each validation error to its corresponding dialog. A validation response, including dialog-to-error mapping information, is sent to the remote machine. In one embodiment, the dialogs are registered so they may be capable of listening to the validation report when it is received at the remote machine. Once the dialogs have listened to the validation report, such as review the information contained in the validation report, using a listening module at the remote machine, the validated errors and their corresponding dialogs may be ordered in a particular order, using an ordering logic (which may have been provided by the host machine 100), based on predefined criteria. The ordered error messages are then displayed to the user.

FIG. 2A illustrates validation mechanism 108 according to one embodiment. In one embodiment, validation mechanism 108 residing at host (server) machine 100 includes validation mechanism 108 having an analysis module 202 and a mapping module 204. Host machine 100 is in communication with another (remote client) machine 220 having a transmit-listen-elect mechanism (TLE mechanism) 230. The TLE mechanism 230 further includes a transmit module 232, a listen module 234, and an ordering logic 236. The two machines 100, 220 may be connected over a network 210 (e.g., Internet). The word elect in "transmit-listen-elect" refers to electing errors so that a particular order or priority or priority level may be assigned to each error.

The remote machine 220, for example, experiences multiple validation errors that are associated with a number of error dialogs, where each dialog includes certain configuration parameters that need to be validated at the host machine 100. These dialogs and their configuration parameters are put together in a validation request and provided by the transmit module 232 to the validation mechanism 108. In one embodiment, the analysis module 202 of the validation mechanism 108 receives the dialogs and their configuration parameters and undertakes analysis of the configuration parameters and validation of the errors. For example, and in one embodiment, the analysis module 202 matches the received set configuration parameters to the configuration parameters and other relevant information on file and then, based on results of the analysis, triggers the mapping module 204 to generate mapping or linking of validation errors to their corresponding error dialogs. Further, a validation report is generated, where the validation report includes the error-dialog mapping information, and provided as part of a validation response sent from the validation mechanism 108 to the listen module 234.

In one embodiment, the listen module 234 of the TLE mechanism 230 receives and listens to contents of the validation report provided in the validation response, and uses the ordering logic 236 to elect certain errors and dialogs for ordering. In one embodiment, the dialogs are registered to they may listen or review or studying, using the listening module 234, the contents of the validation report received from the host machine 100. Further, in one embodiment, the ordering logic 236 places various errors and their corresponding dialogs in a particular order based on predetermined criteria, such as priority-based criteria where high priority errors may be displayed ahead of other errors. For example, of an error requires basic information (e.g., client name, user identification, etc.), sensitive information (e.g., Social Security Number, date of birth, etc.), other information that is determined as important to the working of a software application or system (e.g., an internet protocol (IP) address, etc.) may be prioritized in such a way that it is elected and ordered to be shown above and/or before other errors/dialogs. Although this ordering may be performed on the client-side by a user (e.g., software developer, system administrator, etc.) based on certain criteria that may (or may not) be predefined, the ordering logic 236 may be generated, provided, and/or be part of the validation mechanism 108.

In one embodiment, a Graphical User Interface (GUI)-based application may be used at the remote machine 220 to display the error dialogs and their associated error messages, validation results, as and any other relevant information (e.g., editing information to edit the validation results, ordering of the error dialogs, etc.) to the user.

Figure 2B:
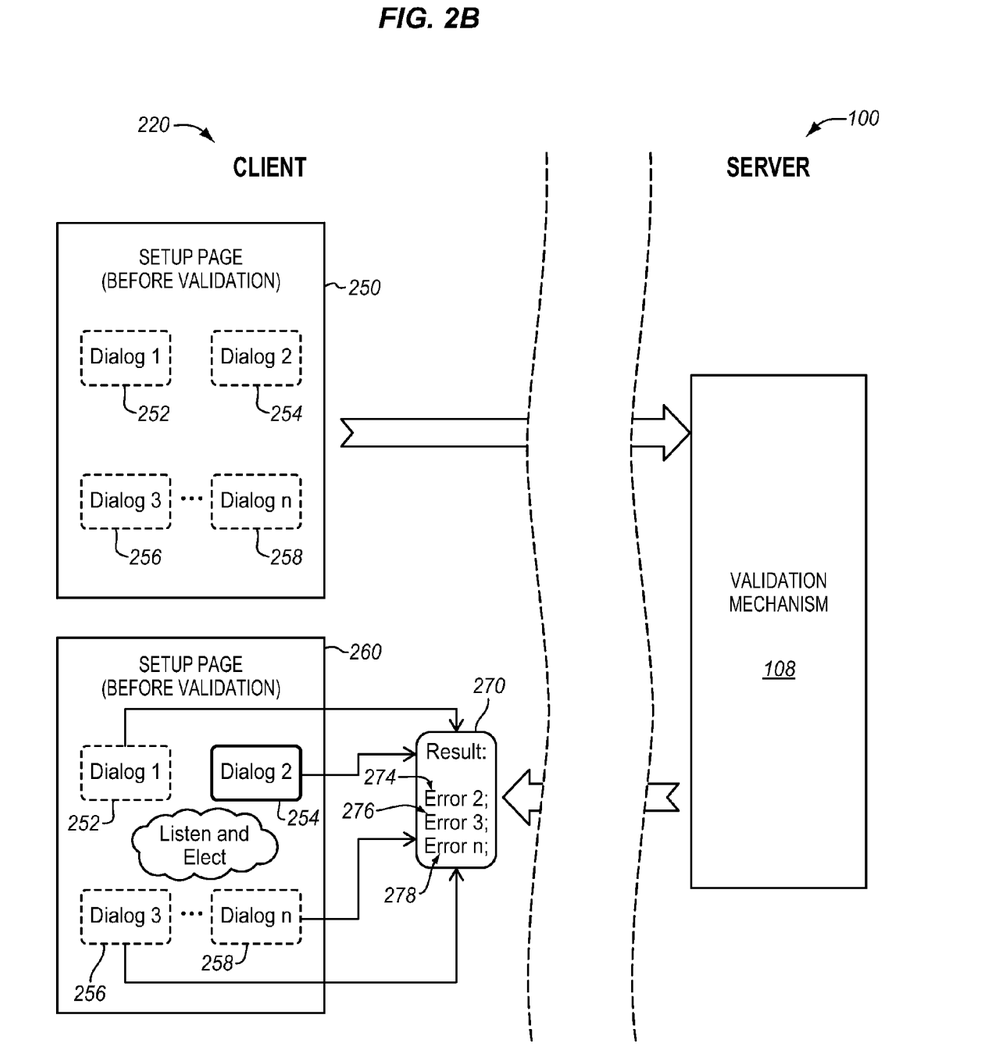
FIG. 2B illustrates a transaction sequence using validation mechanism 108 according to one embodiment.

FIG. 2B illustrates a transaction sequence using validation mechanism 108 according to one embodiment. In one embodiment, validation mechanism 108 is used to map each validation error to a client-side dialog and that are provided to the client machine 220 in a validation response including a validation report having some of the information contained in the illustrated validation results 270. Further, in one embodiment, different priorities or priority levels are assigned to various validation errors based on the application of ordering logic 236. In the illustrated embodiment, various error dialogs 252-258 are sent in a batch mode for performance from the client machine 220 to the validation mechanism 108 at the server machine 100. During runtime, the dialogs 252-258 are registered with a listening module 234 to listen to the validation report from the server machine 100. Using this technique, if there are any validation errors (or error messages) 274-278 coming back, the dialogs 252-258 can collaboratively listen to and check the returned errors and elect to show up only one at a time according to, for example, a predefined order.

In the illustrated embodiment, the client machine 220 provides a first setup page 250 that contains a number of dialogs 1–n 252-258, where each dialog contains certain configuration parameters need to be validated by the validation mechanism 108 at the server machine 100. It is contemplated that merely four dialogs 252-258 and three error messages 274-278 are illustrated as an example for brevity, clarity and ease of understanding and that in actually, there could be any number of dialogs and errors, etc. For illustration purpose, dialog numbers, 1 through n 252-258, represent an actual order to show corresponding dialogs in case of any of the errors 274-278 being returned back after validation. At the server machine 100, the configuration parameters submitted by the client machine 220 are received, and the validation mechanism 108 undertakes the analysis and validation of the received configuration parameters, and then forms and transmits back the validation report to client machine 220. In the illustrated embodiment, validation results 270, generated out of the validation report, are shown to include three error messages 2 274, 3 276, and n 278 corresponding to three dialogs 2 254, 3 256, and n 258, respectively. As aforementioned, since the dialogs 252-258 are registered with the listening module 234 so they can listen to the contents of the validation report, each dialog 252-258 can decide, using the ordering logic 236, which error message 274-278 is to be shown in what order. In the illustrated embodiment, dialogs 2 254, 3 256, and n 258 are shown in the validation results 270 as they are the ones that contain errors or error messages 2 274, 3 276, and n 278, respectively; while, dialog 1 252 is not contained in the validation results 270 since it does not contain an error or error message. In the illustrated embodiment, error 2 274 is assigned the highest priority, using the ordering logic 236, by, for example, dialog 2 254 and therefore, error 2 274 is shown first in the validation results 270. Similarly, error 3 276 and error n 278 associated with dialogs 3 256 and dialog n 258 subsequently appear in the validation results 270. For example, these validation results 270 may be provided and displayed to the user so that user may use this information to perform various tasks, including resubmitting the configuration parameters or settings to the validation mechanism 108 for another round of error validation.

Figure 3A:
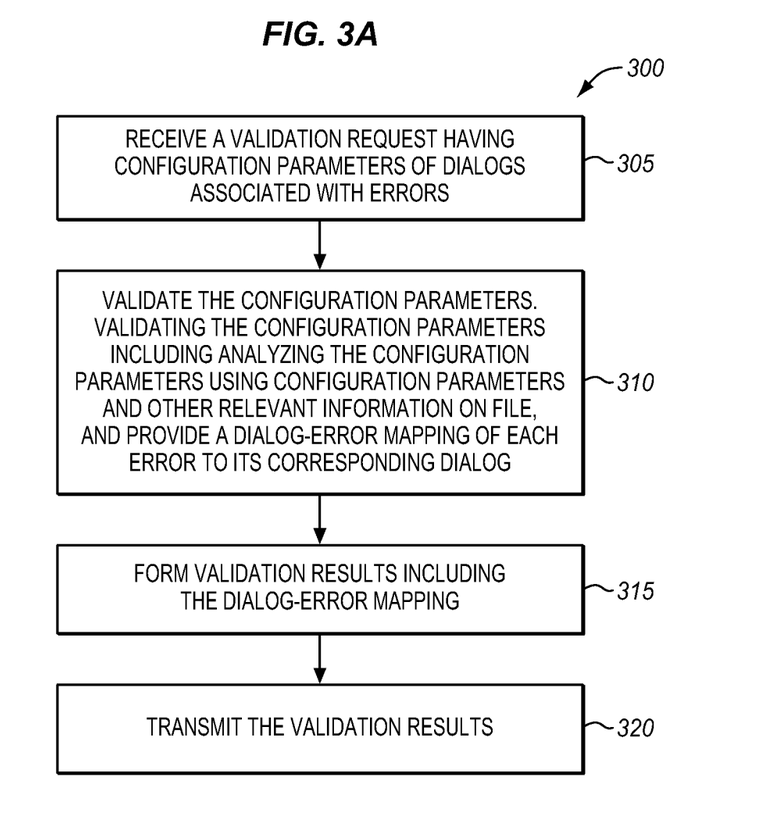
FIG. 3A illustrates a method for facilitating efficient error handling according to one embodiment.

FIG. 3A illustrates a method 300 for facilitating efficient error handling according to one embodiment. Method 300 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 300 is performed by validation mechanism of FIGS. 1 and 2.

Method 300 primarily refers to a server-side method of error validation according to one embodiment. At block 305, a server machine receives, from a client machine, a validation request having configuration parameters of error dialogs associated with errors. At block 310, the configuration parameters are analyzed and the errors are validated, including mapping each error with its dialog. At block 315, a validation report, including error-dialog mapping information, is generated. At block 320, the validation report is provided to the client machine in communication with the server machine.

Figure 3B:
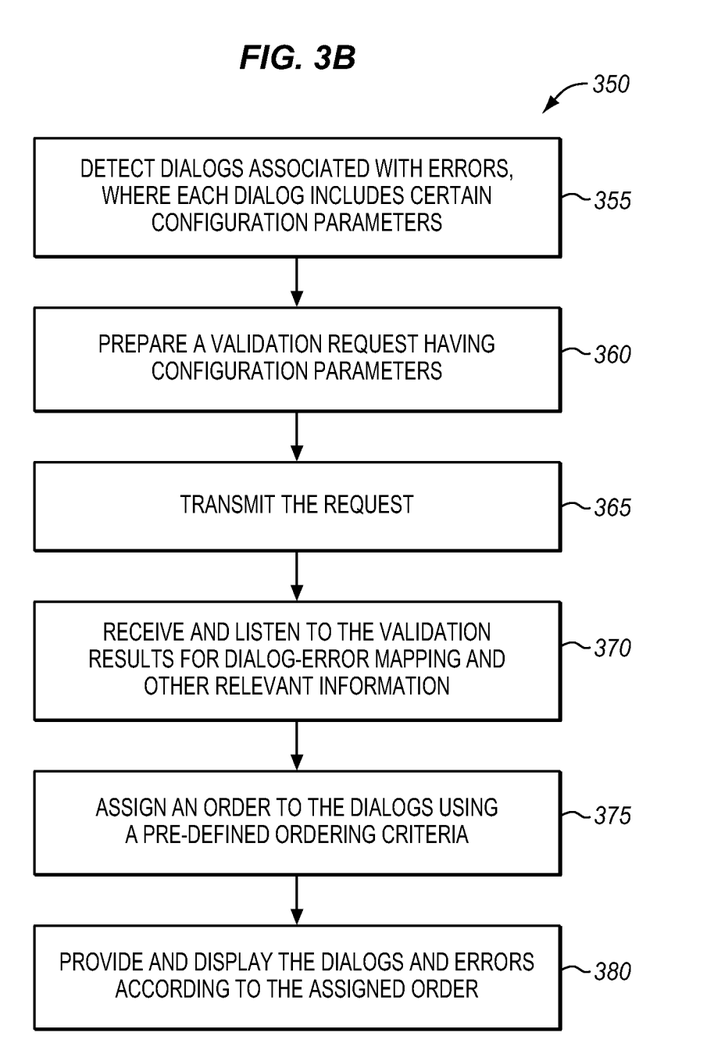
FIG. 3B illustrates a method for facilitating efficient error handling according to one embodiment.

FIG. 3B illustrates a method 350 for facilitating efficient error handling according to one embodiment. Method 350 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 350 is performed by validation mechanism and TLE mechanism of FIGS. 1 and 2.

Method 350 primarily refers to a client-side method of error validation according to one embodiment. At block 355, a client machine detects dialogs associated with errors, where each dialog includes certain configuration parameters. At block 360, a validation request having the configuration parameters is prepared. The validation request is then provided to a server machine coupled with the client machine at block 365. The client machine receives and listens to contents of the validation report received from the server machine at block 370. The validation report may include mapping of each error to a dialog as validated by the validation mechanism. At block 375, a particular order is assigned to the errors and their corresponding dialogs based on, for example, predefined criteria that may be based on one or more of error type, sensitivity of the content relating to an error, business goals, system capabilities, client wishes, etc. Assigning the order may include assigning priorities or priority levels to each error message and the respective dialogs in accordance with the predefined criteria. At block 380, the error and their corresponding dialogs are displayed, to the user, as validation results according to their assigned order or priority level.

Figure 4:
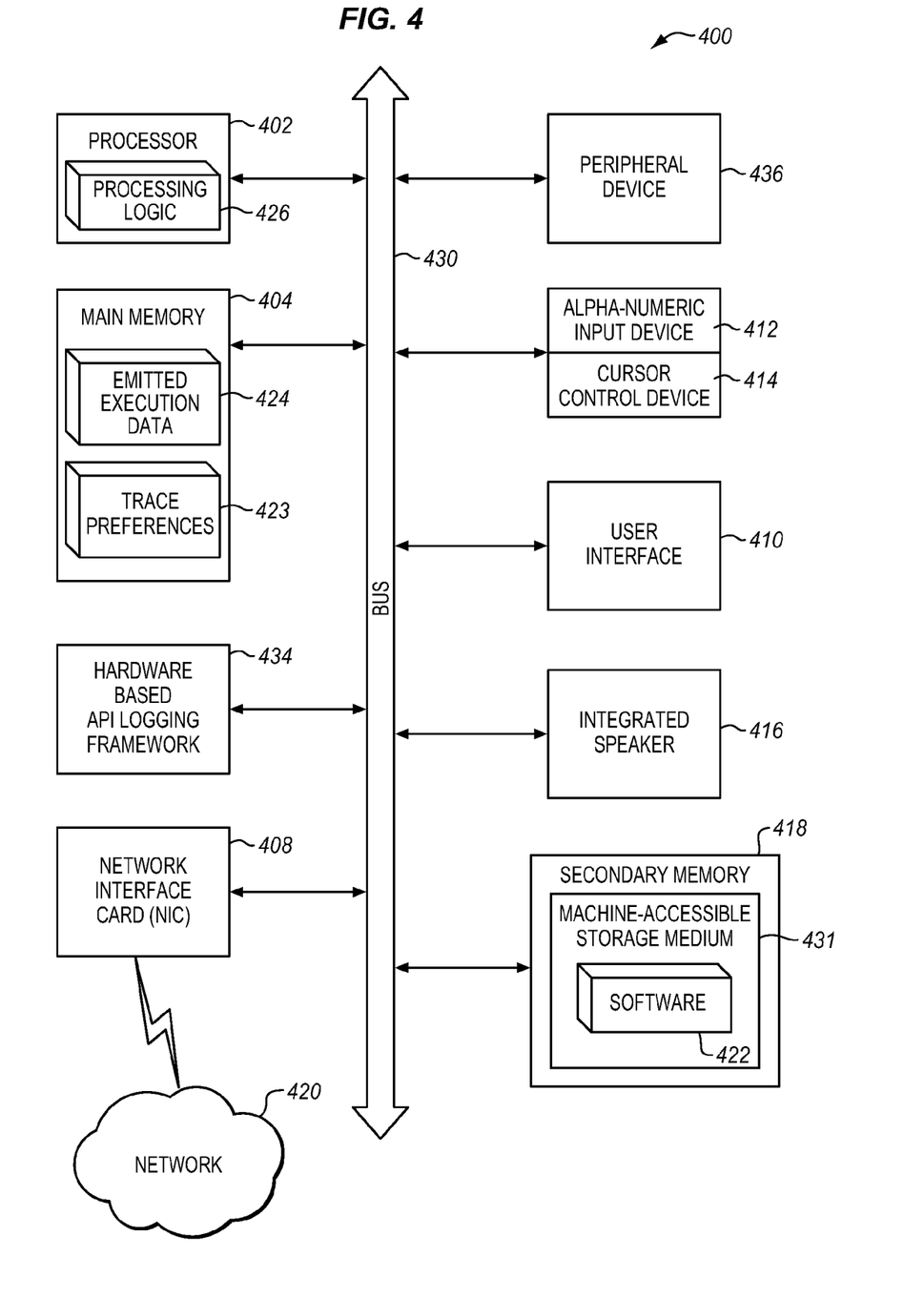
FIG. 4 illustrates a computer system according to one embodiment.

FIG. 4 illustrates a diagrammatic representation of a machine 400 in the exemplary form of a computer system, in accordance with one embodiment, within which a set of instructions, for causing the machine 400 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processor 402, a main memory 404 (e.g., read-only memory (ROM), flash memory, dynamic random access memory (DRAM)

such as synchronous DRAM (SDRAM) or Rambus DRAM (RDRAM), etc., static memory such as flash memory, static random access memory (SRAM), volatile but high-data rate RAM, etc.), and a secondary memory 418 (e.g., a persistent storage device including hard disk drives and persistent multi-tenant data base implementations), which communicate with each other via a bus 430. Main memory 404 includes emitted execution data 424 (e.g., data emitted by a logging framework) and one or more trace preferences 423 which operate in conjunction with processing logic 426 and processor 402 to perform the methodologies discussed herein.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute the processing logic 426 for performing the operations and functionality of validation mechanism 110 and TLE mechanism 230 as described with reference to FIGS. 1 and 2 and other figures discussed herein.

The computer system 400 may further include a network interface card 408. The computer system 400 also may include a user interface 410 (such as a video display unit, a liquid crystal display (LCD), or a cathode ray tube (CRT)), an alphanumeric input device 412 (e.g., a keyboard), a cursor control device 414 (e.g., a mouse), and a signal generation device 416 (e.g., an integrated speaker). The computer system 400 may further include peripheral device 436 (e.g., wireless or wired communication devices, memory devices, storage devices, audio processing devices, video processing devices, etc. The computer system 400 may further include a Hardware based API logging framework 434 capable of executing incoming requests for services and emitting execution data responsive to the fulfillment of such incoming requests.

The secondary memory 418 may include a non-transitory machine-readable storage medium (or more specifically a machine-accessible storage medium) 431 on which is stored one or more sets of instructions (e.g., software 422) embodying any one or more of the methodologies or functions of validation mechanism 108 and TLE mechanism 230 as described with reference to FIGS. 1 and 2 and other figures described herein. The software 422 may also reside, completely or at least partially, within the main memory 404 and/or within the processor 402 during execution thereof by the computer system 400, the main memory 404 and the processor 402 also constituting machine-readable storage media. The software 422 may further be transmitted or received over a network 420 via the network interface card 408.

Figure 5:
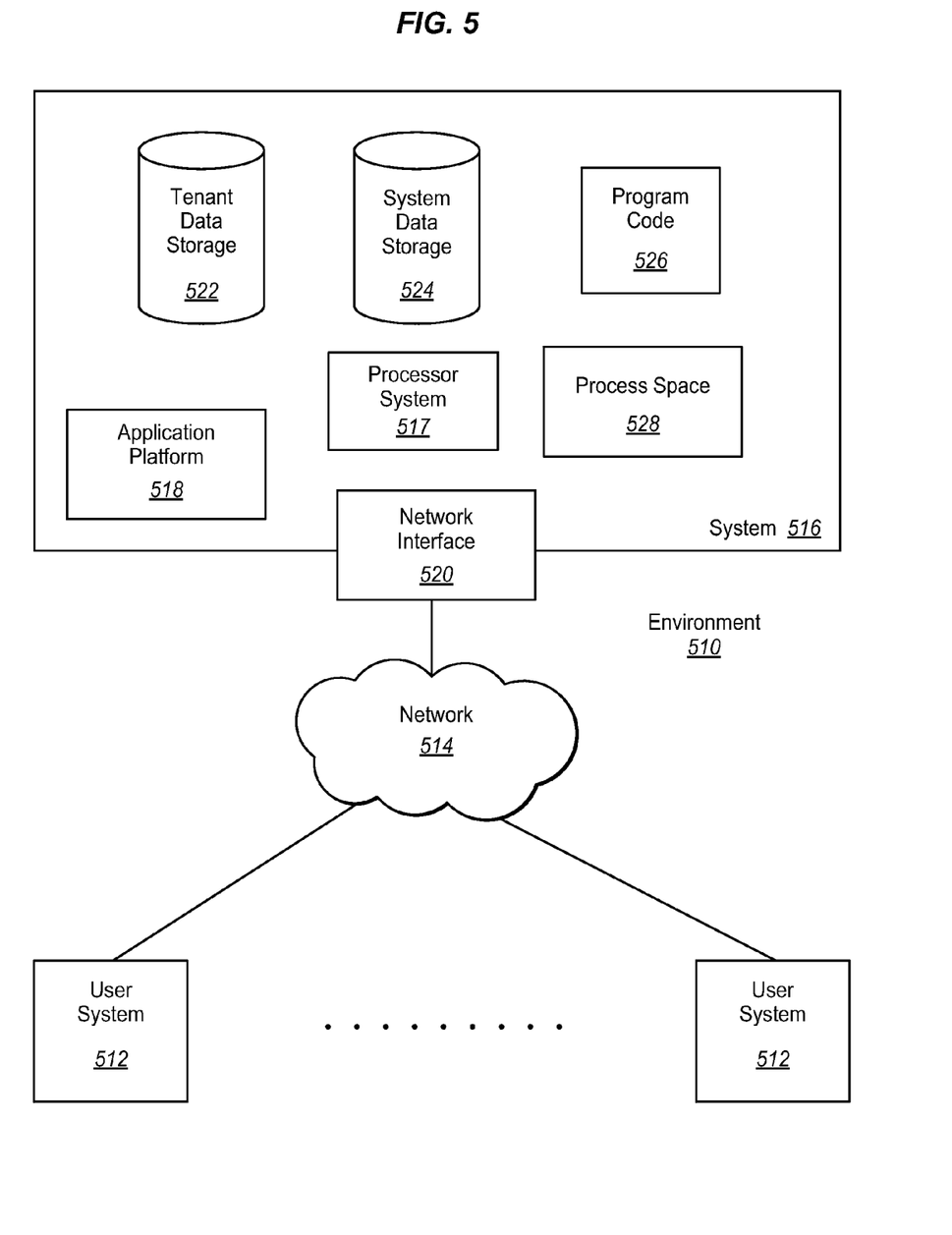
FIG. 5 illustrates a block diagram of an environment wherein an on-demand database service might be used according to one embodiment.

FIG. 5 illustrates a block diagram of an environment 510 wherein an on-demand database service might be used. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in herein FIG. 5 (and in more detail in FIG. 6) user systems 512 might interact via a network 514 with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application (s) including computer code to run using a central processing unit such as processor system 517, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
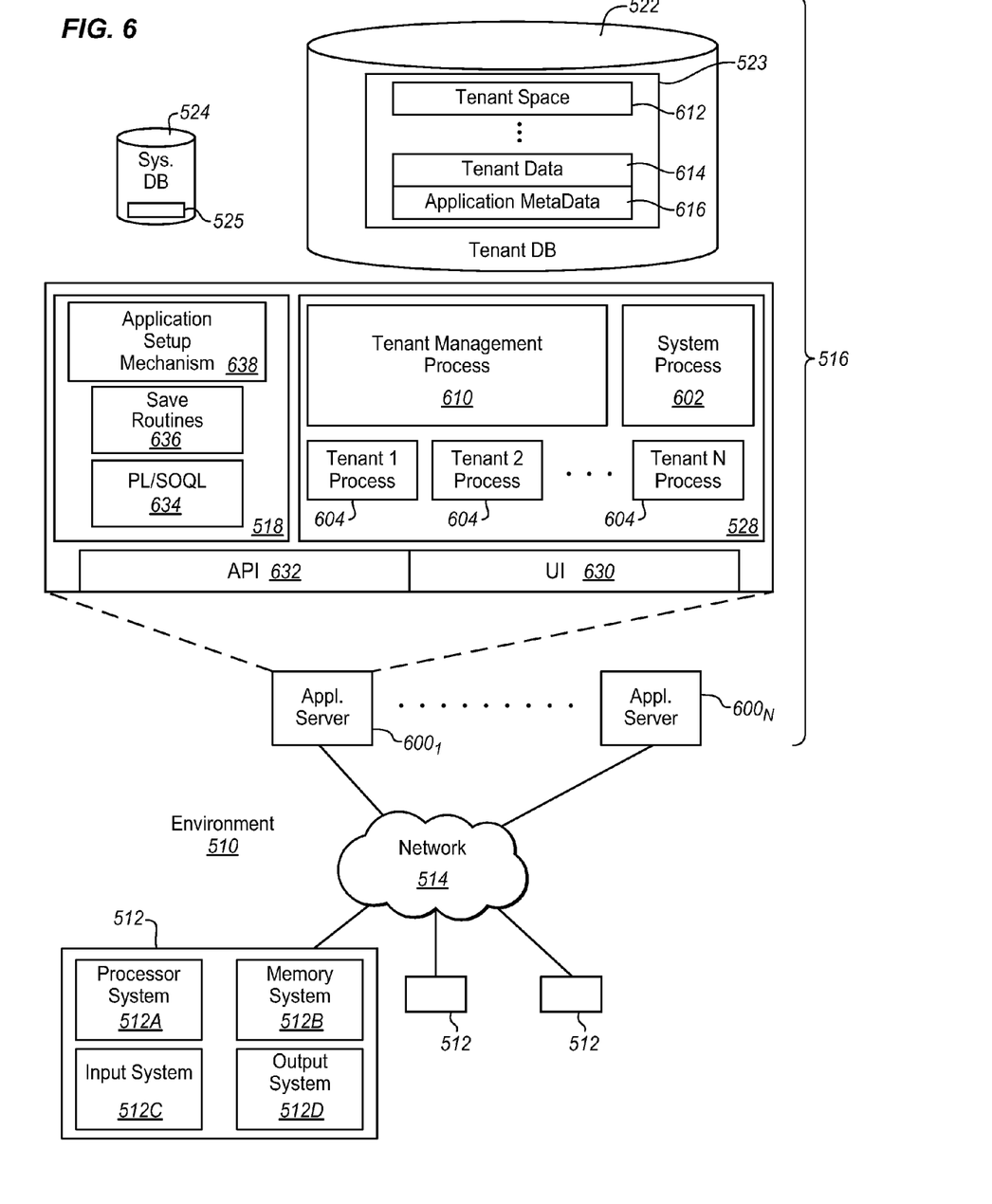
FIG. 6 illustrates a block diagram of an embodiment of elements of environment of FIG. 5 and various possible interconnections between these elements according to one embodiment.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers $600_1$-$600_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A computer-implemented method comprising:
   receiving, at a first computing system, a validation request having configuration parameters of error dialogs relating to errors;
   during runtime, validating, at the first computing system, the configuration parameters and the errors, wherein validating includes mapping each error with a corresponding error dialog based on the corresponding parameters, wherein validating further includes assigning priority levels to the errors and their corresponding error dialogs based on priority-based predetermined criteria obtained through analyzing the configuration parameters; and
   transmitting, from the first computing system to a second computing system, a validating report having results of validation of the configuration parameters and the errors.

2. The computer-implemented method of claim 1, further comprising:
   receiving, at the second computing system, the validation report from the first computing system; and
   during runtime, assigning order, at the second computing system, the errors and their corresponding error dialogs for correction based on the first computing system-assigned priority levels.

3. The computer-implemented method of claim 2, further comprising displaying, at the second computing system via a display device, the errors and the error dialogs according to the ordering of each error and its corresponding error dialog.

4. The computer-implemented method of claim 1, wherein the first computing system is coupled to the second computing system over a network, the first computing system including a server computing system, wherein the second computing system includes a client computing system having a software application providing a user interface, wherein the software application including one or more of a business software application, a business networking website, and a social networking website.

5. The method of claim 1, wherein the network comprises one or more of a cloud-based network, a Local Area Network (LAN), a Wide Area Network (WAN), a Metropolitan Area Network (MAN), a Personal Area Network (PAN), an intranet, an extranet, or the Internet.

6. The method of claim 1, further comprising during runtime, dynamically registering the error dialogs with the second computing system to allow dynamic management of the errors and their corresponding error dialogs, wherein dynamic management includes maintaining the assigned order of the errors and one or more returned errors to correct the errors in the assigned ordered based on the priority-based predetermined criteria and further based on the configuration parameters.

7. The method of claim 6, wherein dynamic management further comprises listening to contents of the validation report to perform one or more tasks including facilitate resending of one or more errors and the configuration parameters to the first computing system for another round of validation and selectively displaying the errors.

8. A non-transitory machine-readable medium carrying one or more sequences of instructions which when executed by one or more processors, cause the one or more processors to carry out one or more operations comprising:
  receiving, at a first computing system, a validation request having configuration parameters of error dialogs relating to errors;
  during runtime, validating, at the first computing system, the configuration parameters and the errors, wherein validating includes mapping each error with a corresponding error dialog based on the corresponding parameters, wherein validating further includes assigning priority levels to the errors and their corresponding error dialogs based on priority-based predetermined criteria obtained through analyzing the configuration parameters; and
  transmitting, from the first computing system to a second computing system, a validating report having results of validation of the configuration parameters and the errors.

9. The non-transitory machine-readable medium of claim 8, wherein the one or more operations further comprise:
  receiving, at the second computing system, the validation report from the first computing system; and
  during runtime, assigning order, at the second computing system, the errors and their corresponding error dialogs for correction based on the first computing system-assigned priority levels.

10. The non-transitory machine-readable medium of claim 9, wherein the one or more operations further comprise displaying, at the second computing system via a display device, the errors and the error dialogs according to the ordering of each error and its corresponding error dialog.

11. The non-transitory machine-readable medium of claim 8, wherein the first computing system is coupled to the second computing system over a network, the first computing system including a server computing system, wherein the second computing system includes a client computing system having a software application providing a user interface, wherein the software application including one or more of a business software application, a business networking website, and a social networking website.

12. The non-transitory machine-readable medium of claim 8, wherein the network comprises one or more of a cloud-based network, a Local Area Network (LAN), a Wide Area Network (WAN), a Metropolitan Area Network (MAN), a Personal Area Network (PAN), an intranet, an extranet, or the Internet.

13. The non-transitory machine-readable medium of claim 8, herein the one or more operations further comprise during runtime, dynamically registering the error dialogs with the second computing system to allow dynamic management of the errors and their corresponding error dialogs, wherein dynamic management includes maintaining the assigned order of the errors and one or more returned errors to correct the errors in the assigned ordered based on the priority-based predetermined criteria and further based on the configuration parameters.

14. The non-transitory machine-readable medium of claim 13, wherein dynamic management further comprises listening to contents of the validation report to perform one or more tasks including facilitate resending of one or more errors and the configuration parameters to the first computing system for another round of validation and selectively displaying the errors.

15. A system comprising:
  a computing device having a processing device and a memory coupled to the processing device, the memory to store instructions relating to a mechanism, and the processing device to execute the instructions, the mechanism to perform one or more operations including:
  receiving, at a first computing system, a validation request having configuration parameters of error dialogs relating to errors;
  during runtime, validating, at the first computing system, the configuration parameters and the errors, wherein validating includes mapping each error with a corresponding error dialog based on the corresponding parameters, wherein validating further includes assigning priority levels to the errors and their corresponding error dialogs based on priority-based predetermined criteria obtained through analyzing the configuration parameters; and
  transmitting, from the first computing system to a second computing system, a validating report having results of validation of the configuration parameters and the errors.

16. The system of claim 15, wherein the one or more operations further comprise:
  receiving, at the second computing system, the validation report from the first computing system; and
  during runtime, assigning order, at the second computing system, the errors and their corresponding error dialogs for correction based on the first computing system-assigned priority levels.

17. The system of claim 16, wherein the one or more operations further comprise displaying, at the second computing system via a display device, the errors and the error dialogs according to the ordering of each error and its corresponding error dialog.

18. The system of claim 15, wherein the first computing system is coupled to the second computing system over a network, the first computing system including a server computing system, wherein the second computing system includes a client computing system having a software application providing a user interface, wherein the software application including one or more of a business software application, a business networking website, and a social networking website, wherein the network comprises one or more of a cloud-based network, a Local Area Network (LAN), a Wide Area Network (WAN), a Metropolitan Area Network (MAN), a Personal Area Network (PAN), an intranet, an extranet, or the Internet.

19. The system of claim 15, herein the one or more operations further comprise during runtime, dynamically registering the error dialogs with the second computing system to allow dynamic management of the errors and their corresponding error dialogs, wherein dynamic management includes maintaining the assigned order of the errors and one or more returned errors to correct the errors in the assigned ordered based on the priority-based predetermined criteria and further based on the configuration parameters.

20. The system of claim 19, wherein dynamic management further comprises listening to contents of the validation report to perform one or more tasks including facilitate resending of one or more errors and the configuration parameters to the first computing system for another round of validation and selectively displaying the errors.

* * * * *